United States Patent [19]

Taguchi et al.

[11] Patent Number: 4,845,478
[45] Date of Patent: * Jul. 4, 1989

[54] COORDINATE INPUT DEVICE WITH DISPLAY

[75] Inventors: Yoshinori Taguchi; Tsuguya Yamanami, both of Ageo, Japan

[73] Assignee: Wacom Co., Ltd., Saitama, Japan

[*] Notice: The portion of the term of this patent subsequent to Jan. 6, 2004 has been disclaimed.

[21] Appl. No.: 685,184

[22] Filed: Dec. 21, 1984

[30] Foreign Application Priority Data

Dec. 22, 1983 [JP] Japan .................. 58-242669

[51] Int. Cl.$^4$ .............................................. G01B 7/14
[52] U.S. Cl. ....................................... 340/712; 178/18; 340/706
[58] Field of Search ............... 340/706, 712, 709, 711; 178/18, 19

[56] References Cited

U.S. PATENT DOCUMENTS

| | | | |
|---|---|---|---|
| 3,087,140 | 4/1963 | O'Neill | 340/943 |
| 4,273,954 | 6/1981 | Takeuchi et al. | 178/19 |
| 4,298,772 | 11/1981 | Kobayashi et al. | 178/18 |
| 4,420,896 | 12/1983 | Castleberry | 340/763 |
| 4,514,688 | 4/1985 | Whetstone | 178/18 |
| 4,520,357 | 5/1985 | Castleberry et al. | 178/18 |
| 4,617,515 | 10/1986 | Taguchi et al. | 178/18 |
| 4,634,973 | 1/1987 | Murakami et al. | 178/18 |
| 4,639,720 | 1/1987 | Rympalski et al. | 340/712 |

*Primary Examiner*—David K. Moore
*Assistant Examiner*—Alvin Oberley
*Attorney, Agent, or Firm*—Pollock, VandeSande & Priddy

[57] ABSTRACT

A coordinate input device with a display includes a position detecting tablet having a plurality of X-direction magnetostrictive transmission mediums and a plurality of Y-direction magnetostrictive transmission mediums superposed orthogonally, a first coil wound around one end of the array of magnetostrictive transmission mediums, and a second coil wound over substantially the entire lengths of the magnetostrictive transmission mediums. A position indicated on the tablet by a position indicating magnetism generator is detected by measuring the length of time between the moment at which a pulse current is applied to one of the first and second coils and the moment at which the voltage induced in the other of the first and second coils by a magnetostrictive vibration wave exceeds a threshold value owing to the sudden increase of voltage observed when the wave passes the indicated position. The coordinate input device further has a display unit which is superposed on the tablet and is adapted to directly display the position indicated on the tablet at the corresponding position thereon.

4 Claims, 6 Drawing Sheets

COORDINATE INPUT DEVICE WITH DISPLAY

BACKGROUND OF THE INVENTION

1. Field of the Invention

The present invention relates to a coordinate input device having a display unit superposed on a position detecting tablet and capable of displaying a position which is indicated by a magnetic body on the position detecting tablet.

2. Description of the Prior Art

Hitherto, a coordinate input apparatus having a tablet for inputting hand-written calligraphic characters and patterns and a display unit for displaying the result of such calligraphic specimen and patterns with the tablet and the display unit being constructed independently and disposed separately from each other, has been proposed. With this type of apparatus, however the user is obliged to watch both the tablet surface and the display surface alternately, in order to confirm that the hand-written characters and patterns scribed on the tablet have been correctly recognized and input. Consequently, the work of inputting a sentence by handwritting is impeded thereby reducing the efficiency of the work. In addition, editing operation such as correction and insertion of words and characters requires the moving of a cursor to the position where correction or insertion is to take place. This operation is quite troublesome because the user has to simultaneously move the cursor and confirm the present position of the cursor and the desired word or character in the document.

On the other hand, an input/output device having a tablet and a display unit integrated with each other has been proposed recently in, for example, Japanese Patent Laid-Open No. 144287/1983. In this apparatus, any desired position in a document on display can be indicated on the tablet directly by means of a stylus pen connected to a character recognition circuit, thus facilitating the editing and input/output operations. With this apparatus, therefore, the user can write a sentence simply by drafting the sentence in accordance with the input format observed on the tablet, with the same ease as that of laying out and scribing directly on output paper.

This input/output device, however, suffers from the following disadvantages. Namely, the writing operation for writing the characters and patterns in the writing section of the tablet is inconveniently hindered by the cord connecting the stylus pen to the character recognition circuit. In addition, the stylus pen has to be moved in contact with the tablet or in the close proximity of the tablet in order to attain a highly precise indication of the characters.

SUMMARY OF THE INVENTION

Accordingly, it is a first object of the invention to provide a coordinate input device with a display, wherein the indicating of a position on a tablet is made by quite a simple operation from a position above and remote from the tablet, more particularly, from a position on a display superposed on the tablet.

To achieve this object, the invention proposes the use of a tablet which is composed of a plurality of X-direction magnetostrictive transmission mediums arrayed in parallel, a plurality of Y-direction magnetostrictive transmission mediums arrayed in parallel and substantially perpendicular to the X-direction magnetostrictive transmission mediums, and first and second coils wound around these magnetostrictive transmission mediums. A pulse current is applied to one of the first and second coils so that a voltage is induced in the other array of magnetostrictive transmission mediums by a magnetostrictive vibration wave. When the magnetostrictive vibration wave reaches a position indicated by a position indicating magnetism generator, a voltage induced in the other coil is greatly increased. Therefore, it is possible to detect the indicated position as X- and Y-coordinate data by detecting the length of time between the moment at which the pulse current is applied until the moment at which an induced voltage in excess of a predetermined threshold value is detected.

It is a second object of the invention to provide a coordinate input device with a display which permits direct visual check of the input position clearly on the display.

This can be achieved by superposing a coordinate display directly onto the tablet.

It is a third object of the invention to provide a coordinate input device with a display having improved maneuverability and visibility of the position display.

This object can be achieved by the use of a cordless position indicating magnetism generator which is not connected by a cord to any portion of the tablet.

It is a fourth object of the invention to provide a coordinate input device with a display which can be embodied with a display unit any type and thickness, provided that such a display unit permits the application of only a small magnetic field intensity to the magnetostrictive transmission medium.

These and other objects, features and advantages of the invention will become clear from the following description of the preferred embodiment.

DESCRIPTION OF THE PREFERRED EMBODIMENT

Figure 1:
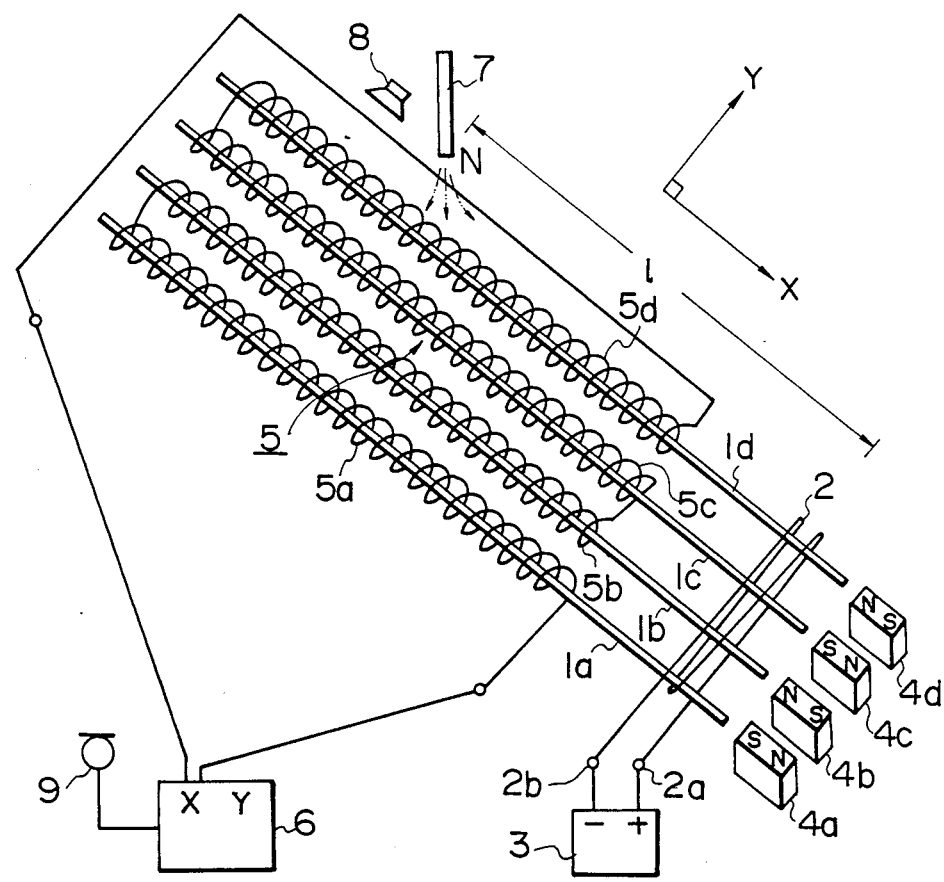
FIG. 1 is an illustration of an X-direction position detecting section in an embodiment of the invention.
Figure 2:
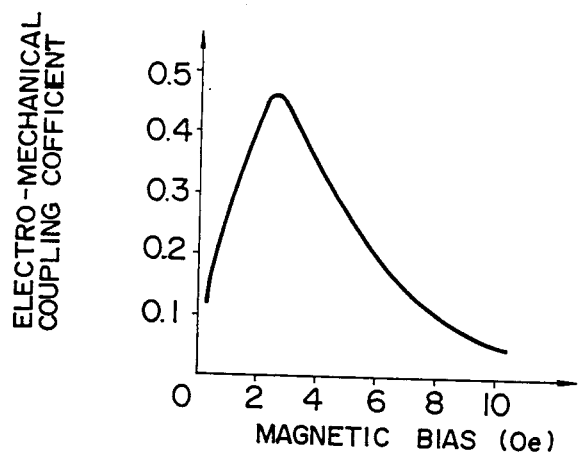
FIG. 2 is a chart showing the relationship between magnetic bias and electro-mechanical coupling coefficient.

Before turning to the detailed description of the invention, the principle of the invention will be explained to facilitate the understanding of the invention.

Theory of the Invention

When a magnetostrictive vibration wave propagates through a magnetostrictive transmission medium, a part of the mechanical vibration energy thereof is converted into magnetic energy so as to cause a local change in the magnetic field at the position where the vibration wave actually is. The level of the change in the magnetic field increased and decreases substantially in proportion to a coefficient of conversion from mechanical energy to electric energy. This coefficient will be referred to as "electro-mechanical coupling coefficient" hereinunder. The electro-mechanical coupling coefficient is maximized in a certain range of level of biasing magnetic field.

Therefore, if a magnetic bias of a level sufficient for increasing the electro-mechanical coupling coefficient is applied by a position indicating magnetism generator to a specific portion of a magnetostrictive transmission medium surrounded by a coil over substantially its entire length, a large change in the magnetic field is caused at the moment when that portion of the transmission medium is reached by the magnetostrictive vibration wave propagating through the transmission medium, so that a high voltage is induced in the coil by the magnetostrictive vibration wave at that moment. It is therefore, possible to determine the length of time required for the magnetostrictive vibration wave to reach the position indicated by the position indicating magnetism generator and, hence, the indicated position, by detecting the timing of the induction of the high voltage in the coil.

It is to be understood also that the magnitude of the magnetostrictive vibration wave, which is caused by applying an instantaneous change in the magnetic field, also increases as the value of the electro-mechanical coupling coefficient becomes greater. Therefore, if magnetism of a level capable of substantially increasing the electro-mechanical coupling coefficient is applied by the position indicating magnetism generator to only a preselected portion of a magnetostrictive transmission medium surrounded by a coil over substantially the entire length thereof, a large magnetostrictive vibration wave is produced only at that preselected position when a pulse voltage is applied to the coil. When this magnetostrictive vibration wave reaches another coil provided at the end of the magnetostrictive transmission medium, a high voltage is induced in this coil by the magnetostrictive vibration wave. By detecting the timing of the generation of this high voltage, it is possible to determine the indicated position.

A position signal based on the timing of the induced electromotive force is input to a computer and can be displayed via a driver, on a display unit having, for instance, liquid crystal elements and electrodes arranged in a grid-like form. It is to be noted that, even if this display unit is superposed on the tablet serving as the position indicating means, the magnetic field produced by the position indicating magnetism generator would still reach the magnetostrictive transmission medium despite the thickness of the display unit, with a sufficient strength.

Since such a magnetic field can be produced by a permanent magnet, it is possible to indicate the position in a cordless manner by using a permanent magnet as the position indicating magnetism generator, and, in addition, the indicated position can be directly displayed on the display unit. By making the display unit have lines and columns corresponding to those on the tablet, it is possible to obtain a coincidence between the position indicated by the magnetism generator and the position indicated on the display unit.

Making efficient use of this principle, the invention provides a coordinate input device in which the indication of a position on a tablet is made through the thickness of a display unit superposed on the tablet, with the indicated position being directly displayed on the display unit superposed on the tablet.

A preferred embodiment of the invention will be described hereinunder.

Referring to FIG. 1, which shows the construction of an X-direction position detecting section of an embodiment, numerals $1a$ to $1d$ denote magnetostrictive transmission mediums made from a material exhibiting a magnetostrictive effect and arrayed so as to extend in the X-direction substantially parallel to one another. Although any ferromagnetic material can be used as the material of the magnetostrictive transmission mediums, material that have a large magnetostrictive effect for producing a large magnetostrictive vibration wave, such as, for example, amorphous alloys having large iron contents is preferred.

It is also preferred that the material has a small coercive force in order that it is not easily magnetized when approached by a magnet. Examples of amorphous alloys which can be suitably used are $Fe_{67}Co_{18}B_{14}Si_1$ (atomic %) and $Fe_{81}B_{13.5}Si_{3.5}C_2$ (atomic %) and the like. Each of the magnetostrictive transmission mediums $1a$ to $1d$ has an elongated form, preferably a thin web-like form with a rectangular cross-section or a linear form with a circular cross-section. When each medium has a rectangular cross-section, its width is preferably several millimeters and thickness is several to several tens of micrometers ($\mu$m) for simultaneously satisfying requirements of both easy fabrication and superior characteristics.

An X-direction first coil 2 is wound around one end of the array of magnnetostrictive transmission mediums $1a$ to $1d$. Although the number of turns of this coil 2 is 2 (two) in the illustrated case, this is not exclusive as the coil 2 can have a single turn or 3 or more turns. This first coil 2 is adapted to produce a momentary change in the magnetic field in the direction perpendicular to the coil surface so as to generate a magnetostrictive vibration wave in the portions of the mediums $1a$ to $1d$ surrounded by this coil 2. One end $2a$ of the coil 2 is connected to the (+) terminal of a pulse current generator 3 which is capable of generating a pulse current of a level large enough to generate the magnetostrictive vibration wave, while the other end $2b$ of the coil 2 is connected to the (−) terminal of the pulse current generator 3.

Numerals $4a$ to $4d$ represent biasing magnetic bodies adapted to apply a biasing magnetic field in the direction parallel to the magnetostrictive transmission mediums $1a$ to $1d$ in the portions of these mediums surrounded by the first coil 2. By the application of this biasing magnetic field, it is possible to cause a large magnetostrictive vibration wave with a comparatively small electric current. Namely, since the electro-mechanical coupling coefficient of the magnetostrictive transmission mediums $1a$ to $1d$ is maximized at a certain level of the biasing magnetic field, as shown in FIG. 1, it is possible to effectively produce the magnetostrictive vibration wave by applying that level of magnetic bias to the portions of the magnetostrictive transmission mediums surrounded by the first coil 2. The biasing magnetic bodies 4a,4c have polarity opposite to that of the biasing magnetic bodies 4b,4d.

Referring to FIG. 1, coils 5a to 5d are wound around corresponding magnetostrictive transmission mediums 1a to 1d. These second coils 5a to 5d are for detecting the voltage induced by the magnetostrictive vibration wave propagating through the magnetostrictive transmission mediums 1a to 1d, and are wound over a substantial region along the length of the respective magnetostrictive transmission mediums, and the region surrounded by these second coils 5a to 5d is the region in which position is indicated and detected. In order to induce a high voltage, each second coil preferably has a large pitch. In the illustrated embodiment, the pitch of the second coils is 7 turns per centimeter.

All of the second coils 5a to 5d have the same winding direction which is, in this embodiment, counter-clockwise. Connections are made between the terminal ends of the coils 5a and 5b, between the starting ends of the coils 5b and 5c, and between the terminal ends of the coils 5c and 5d. The starting ends of the coils 5a and 5d are connected to X-direction input terminals of a position processing unit 6. Thus, the coils 5a to 5d in this embodiment are connected in series, and adjacent coils have opposite polarities. These second coils 5a to 5d in combination constitute an X-direction second coil 5. Reference numeral 7 designates a bar magnet serving as a position indicating magnetism generator. In the illustrated embodiment, the bar magnet 7 has a diameter of 3 mm and a length of 50 mm.

The arrangement shown in FIG. 1 is intended to detect a position in the X-direction indicated by this bar magnet 7.

Reference numeral 8 designates a transmitter for transmitting an ultrasonic signal for informing the position processing unit 6 of an instruction for the commencement of the measurement. The ultrasonic signal is received by a receiver 9. Ultrasonic ceramic microphones capable of performing both transmission and reception are used as the transmitter 8 and the receiver a in the described embodiment. How the transmitter 8 and the receiver 9 are used will be described later in more detail.

Referring now to FIG. 1, it is assumed here that the position indicating bar magnet 7 is placed at a point on the magnetostrictive transmission medium 1a spaced by a distance l from the center of the X-direction first coil 2, with its N pole directed downward so as to apply (a magnetic field of a level large enough to cause an appreciable increase in the electro-mechanical coupling coefficient) to the portion of the magnetostrictive transmission medium 1a just beneath the magnet 7. When a pulse current is applied by the pulse current generator 3 to the X-direction first coil 2, the coil 2 generates a momentary change in magnetic field which in turn causes a magnetostrictive vibration wave in the portions of the magnetostrictive transmission mediums 1a to 1d surrounded by the X-direction first coil 2. The magnetostrictive vibration wave then propagates longitudinally through the magnetostrictive transmission mediums 1a to 1d at a propagation velocity peculiar to the material of the transmission mediums. The propagation velocity in this case is about 5000 m/s. During the propagation, conversion of a part of the mechanical vibration energy into magnetic energy is effected at each moment, in the portions where the vibration wave is at that moment. The conversion is made at an efficiency corresponding to the electro-mechanical coupling coefficient in those portions of the transmission mediums. As a result, a voltage is induced in the X-direction second coil 5.

Figure 3:
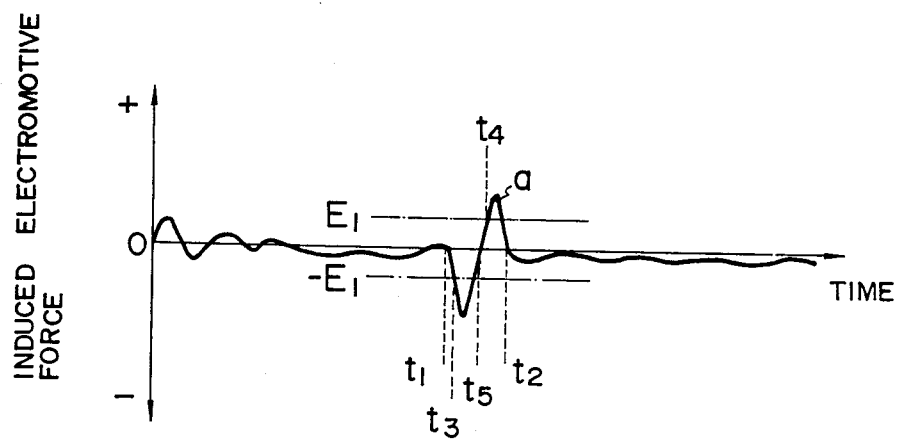
FIG. 3 is a diagram showing an example of a change in electromotive force induced in an X-direction second coil in relation to time.

FIG. 3 exemplarily shows how the voltage induced in the second coil 5 is changed in relation to time from a moment $t=0$ at which the pulse current is applied to the first coil 2. As will be seen from this figure, the amplitude of the induced voltage exhibits peaks from a moment $t_0$ immediately after $t=0$ to a moment $t_1$ to $t_2$ seconds after moment $t_0$. The peak amplitude of the induction voltage immediately after $t=0$ is attributable to mutual electromagnetic induction between the X-direction first coil 2 and the X-direction second coil 5, while the peak amplitude at moment $t_1$ to $t_2$ seconds after $t=0$ is attributable to the fact that the magnetostrictive vibration wave generated in the portion of the transmission mediums surrounded by the X-direction first coil 2 has reached the position immediately beneath the position indicating bar magnet 7 where the electro-mechanical coupling coefficient is increased.

A movement of the position indicating bar magnet 7 along the length of the magnetostrictive transmission mediums causes a corresponding movement of the induction voltage along the time axis. It is, therefore, possible to compute the distance l and, hence, the X-direction position indicated by the position indicating bar magnet 7, by measuring the length time between the moment $t_0$ and the moment $t_1-t_2$.

The measurement of the propagation time for detecting the position may be made by sensing, as shown in FIG. 3, a moment at which the amplitude of the voltage induced by the magnetostrictive vibration falls below a predetermined threshold level $-E1$. Alternatively, a moment $t_4$ at which the voltage rises above a threshold value $E1$ or a zero-crossing point $t_5$ may be used as the index of propagation time.

Figure 4:
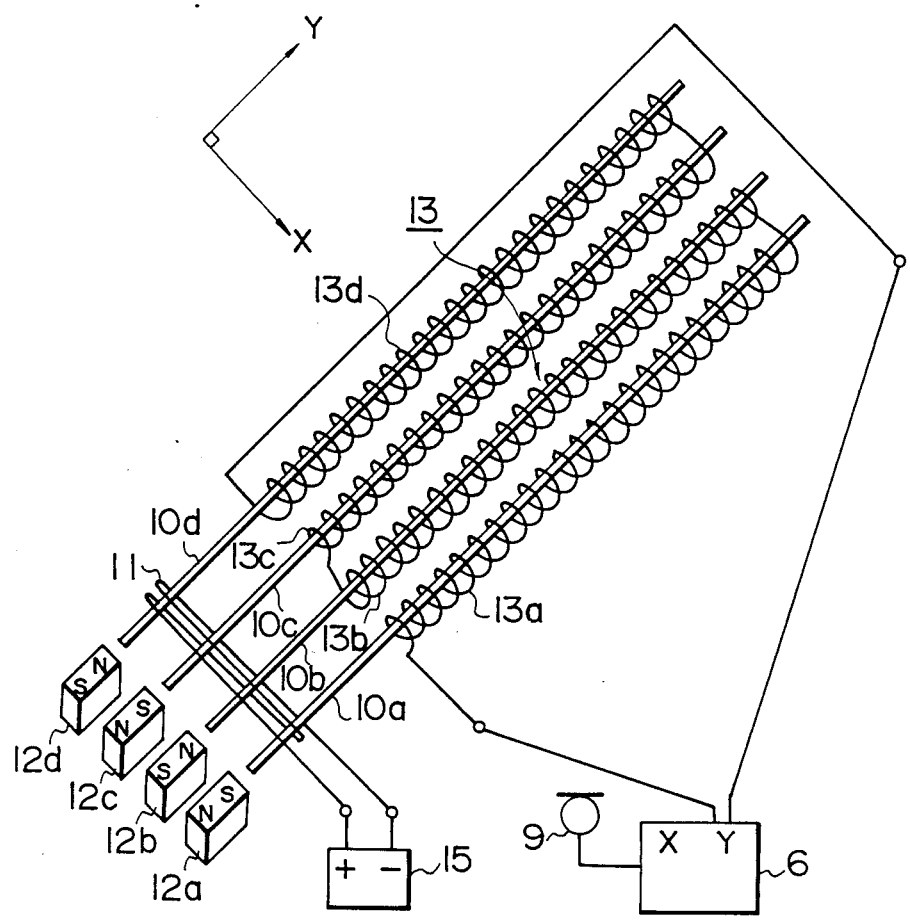
FIG. 4 is an illustration of a Y-direction position detecting section which is used in combination with the X-direction position detecting section.

FIG. 4 shows the construction of a Y-direction position detecting section which is used in combination with the X-direction position detecting section. Numerals 10a to 10d denote magnetostrictive transmission mediums which are arrayed substantially parallel to each other in the Y-direction, 11 denotes a Y-direction first coil wound around one end of the array of mediums 10a to 10d, 15 denotes a Y-direction pulse current generator adapted to apply a pulse current to the Y-direction first coil 11 so as to produce a magnetostrictive vibration wave simultaneously in the magnetostrictive transmission mediums 10a to 10d, 12a to 12d denote biasing magnetic bodies adapted to apply a biasing magnetic field to the portions of the magnetostrictive transmission mediums 10a to 10d surrounded by the Y-direction first coil 11, and 13a to 13d denote coils wound round the magnetostrictive transmission mediums 10a to 10d over a substantial length thereof. The coils 13a to 13d are wound in the same direction, which is in this case counter-clockwise. Connections are made between the terminal ends of the coils 13a and 13b, between the starting ends of the coils 13b and 13c, and between the terminal ends of the coils 13c and 13d. The starting ends of the coils 13a and 13d are connected to Y-direction input terminals of the processing unit 6. Thus, the coils 13a to 13d are connected in series so that adjacent coils have opposite polarities, as in the case of the arrangement shown in FIG. 1. The coils 13a to 13d constitute a Y-direction second coil 13.

As will be explained later, the magnetostrictive transmission mediums 10a to 10d surrounded by the Y-direction first coil 1 and the Y-direction second coil 13, as shown in FIG. 4, are superposed as closely as possible on the magnetostrictive transmission mediums 1a to 1d surrounded by the X-direction first coil 2 and the X-direction second coil 5, and are used for detecting of the position indicated by the position indicating magnetism generator in the Y-direction. Details of the construction and the operation of the arrangement shown in FIG. 4 are materially identical to those of FIG. 1 so that the description thereof is omitted.

Figure 5:
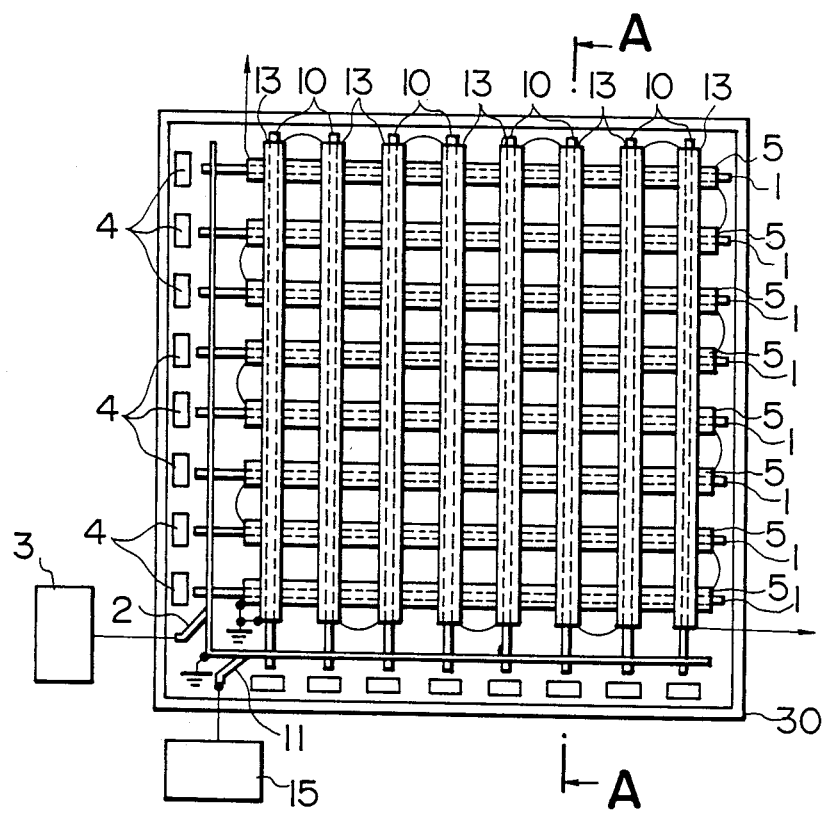
FIG. 5 is a plan view showing an example of the construction of the detecting section of the position detecting apparatus.
Figure 6:
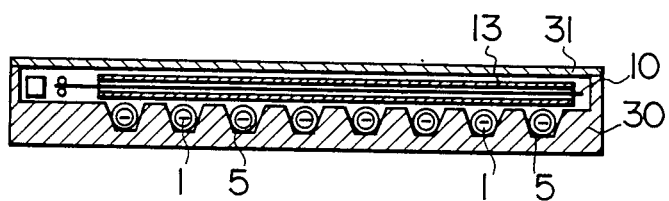
FIG. 6 is a sectional view taken along the line A—A of FIG. 5.

FIG. 5 is a plan view showing an example of the construction of the detecting section of the position detecting apparatus, while FIG. 6 is a sectional view taken along the line A—A of FIG. 5. As will be seen from these figures, the X-direction second coil 5 containing the magnetostrictive transmission mediums 1 is placed in a recess formed in an inner bottom surface of a housing 30 and the Y-direction second coil 13 is laid thereon and fixed as required by means of, for example, adhesive.

The X- and Y-direction first coils 2 and 11 are each grounded at one end thereof while the other ends thereof are lead out for the connection to the X-direction pulse current generator 3 and the Y-direction pulse current generator 15, respectively. The X- and Y-direction second coils 5 and 13 are each grounded at one end thereof while the other ends thereof are lead out for connection to the processing unit 6.

The biasing magnetic bodies 4 are fixed to the inner bottom surface of the housing 30 so as to face to the ends of the magnetostrictive transmission mediums 1 and 10, although they may be disposed in parallel at the upper, lower or lateral side of the same. The housing 30 is capped with a cover 31 on which the position indicating bar magnet 7 is moved.

Figure 7:
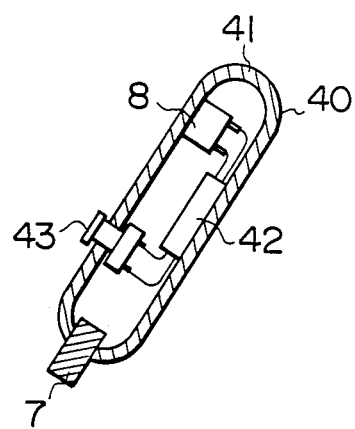
FIG. 7 is a sectional view of an example of a position indicating magnetism generator.
Figure 8:
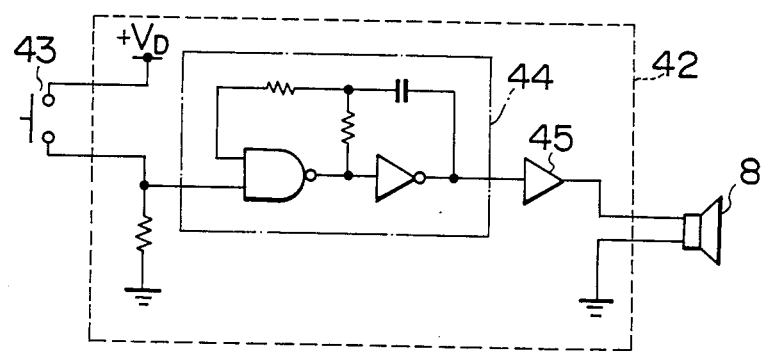
FIG. 8 is a circuit diagram of the position indicating magnetism generator of FIG. 7.

FIG. 7 is a sectional view of an example of a position indicating magnetism generator, while FIG. 8 is an electric circuit diagram of the position indicating magnetism generator.

A position indicating magnetic generator 40 has a cylindrical magnetic body, i.e., the bar magnet 7, attached to one end of a pen-shaped vessel 41 to the other end of which is attached the transmitter 8. The pen-shaped vessel 41 accomodates a signal generator 42 which is adapted to be operated by an operation switch 43 which can be operated from the outside of the pen-shaped vessel 41. In operation, when the operation switch 42 is turned on, an oscillation circuit 44 including an AND circuit, inverter, resistors and a capacitor starts to oscillate so as to generate continuous pulse signals which indicate the commencement of measurement. The pulse signals are amplified by an amplifier 45 and converted into an ultrasonic signal. This ultrasonic signal is transmitted to the air and is received by the receiver 9.

In the embodiment described hereinbefore, biasing magnetic bodies are provided for each of the magnetostrictive transmission mediums. This, however, is not exclusive and the arrangement may be such that one biasing magnetic body is used for X-direction magnetostrictive transmission mediums and one biasing magnetic body is used for Y-direction magnetostrictive tansmission mediums. In such a case, it is preferred that the X-direction first coil or the Y-direction first coil is wound so that coil sections wound around adjacent magnetostrictive transmission mediums having opposite winding directions. By so doing, it is possible to decrease the level of electromotive force produced by electromagnetic induction between the first coil and the second coil.

Figure 9:
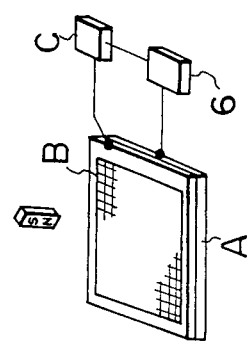
FIG. 9 is a perspective view of a coordinate input device with a display constructed in accordance with the invention.

FIG. 9 shows a coordinate input device with a display in accordance with the invention. The device has a tablet A constituting the main part of the detection apparatus and a display unit B superposed on the tablet A. The tablet A is connected to the position processing unit 6 while the display unit B is connected to a position display device C.

The display unit B may be a known matrix-type liquid crystal display unit having liquid crystal mediums disposed between horizontal electrodes and vertical electrodes which are arranged so as to cross each other.

Figure 10:
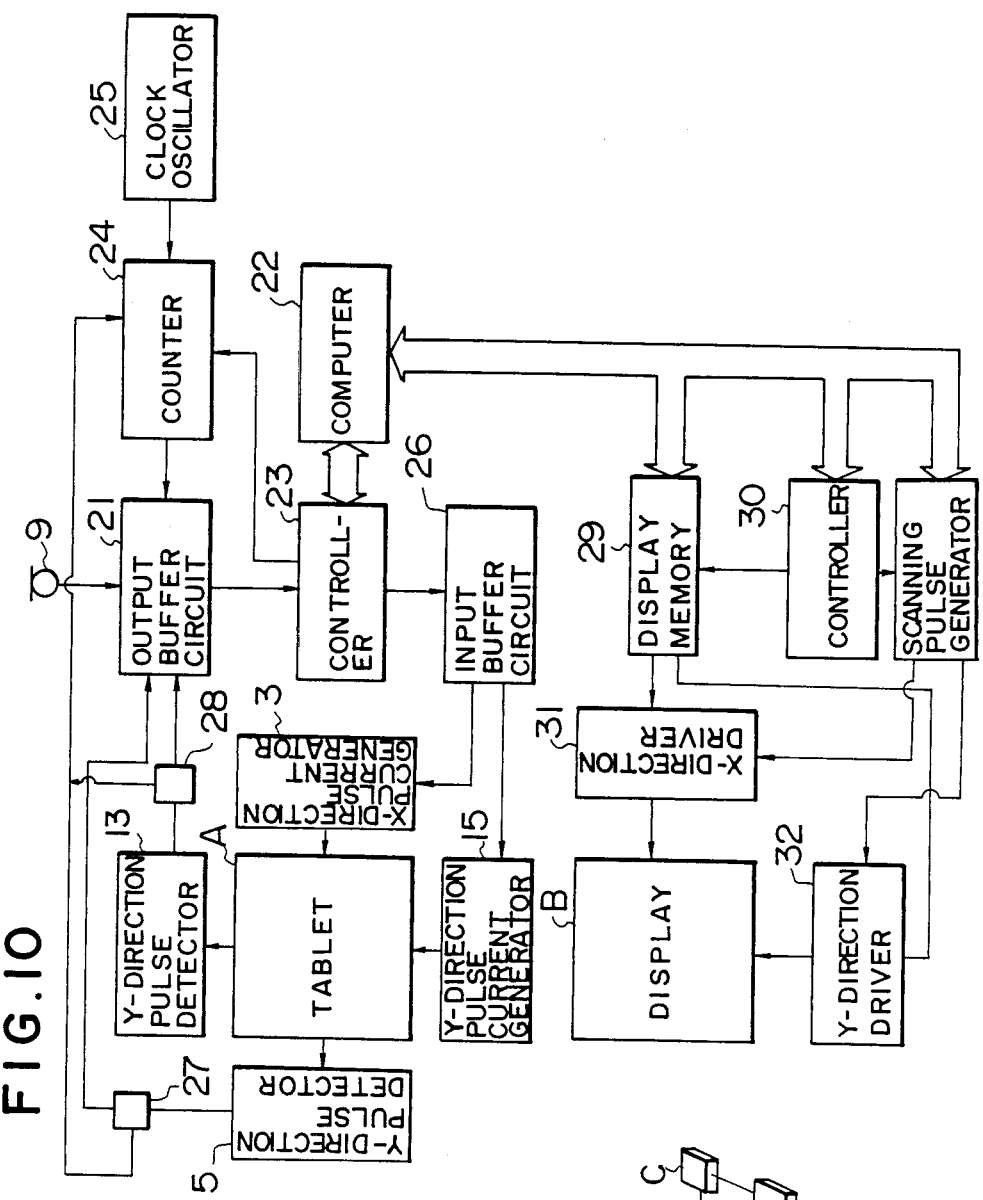
FIG. 10 is a block diagram of a coordinate input/output circuit.

FIG. 10 is a block diagram showing an example of the position processing unit 6 and the position display device C. The operation of this circuit is as follows.

For detecting the X-direction position and the Y-direction position on the tablet A, an X-input circuit and an Y-input circuit of the position processing unit 6 are set in a state ready for reception of position signals.

Then an ultrasonic signal indicating the commencement of measurement, in the form of consecutive pulses of a predetermined frequency, is transmitted by the transmitter 8 and is received by the receiver 9. The received ultrasonic signal is converted into an electric signal in the form of consecutive pulses. The received pulse signals are then delivered to an output buffer circuit 21 through an amplifier and a wave shaping circuit. Then a computer reads the consecutive pulse signals from the output buffer circuit through a controller 23, thus recognizing the commencement of the measurement.

Upon receipt of the consecutive pulse signals, the computer 22 delivers a signal to the controller 23 to make the latter clear the content of a counter 24. The counter 24 then starts to count clock pulses produced by a clock oscillator 25 at a frequency of, for example, 100 MHz. At the same time, an output of the computer 22 triggers the operation of the X-direction pulse current generator 3 and the Y-direction pulse current generator 15 through an input buffer circuit 26, so that these generators apply pulse currents to the X-direction first coil 2 and the Y-direction first coil 11, respectively.

As a result, electromotive forces are induced in the X-direction second coil 5 and the Y-direction second coil 13 by the magnetostrictive vibration waves. When each magnetostrictive vibration wave reaches the position indicated by the position indicating bar magnet 7, the level of the corresponding induced voltage is increased. The induced voltages are input to threshold value detecting devices 27 and 28 through multiplexers and other devices. A threshold value such as a voltage $E_1$ is set in these threshld value detecting devices 27 and 28. Assuming that the electromotive force shown by (a) in FIG. 3 has been induced by the magnetostrictive vibration wave, the counter 24 stops its counting operation when the threshold value $E_1$ is exceeded by the electromotive force, i.e., when the portion of positive polarity of the voltage induced by the magnetostrictive vibration wave is detected.

Thus, the counter 24 stops counting when a voltage induced by a magnetostrictive vibration wave appears in the X-direction second coil 5 or the Y-direction second coil 13, so that the time duration from the moment of generation of the first clock pulse is measured by the content of the counter 24. Since the magnetostrictive vibration wave propagates at a substantially constant velocity of about 5,000 m/s, the thus measured time duration corresponds to the X-direction distance between the X-direction first coil 2 and the position indicating magnetism generator 7 or the Y-direction distance between the Y-direction first coil 11 and the position indicating magnetism generator 7. The position data in the respective directions, thus obtained in the form of digital values, are delivered to a digital display through the output buffer circuit 21 for display or to the computer 22 for suitable processing.

The position data composed of the X-direction position data and the Y-direction position data successively indicated on the tablet A are input to the computer 22 and are rearranged in accordance with a predetermined sequence and stored in a display memory. The stored data are successively read out in accordance with timing pulses from a controller 30 serving as a display processor, and are delivered to an X-direction driver 31 and a Y-direction driver 32.

The X-direction driver 31 and the Y-direction driver 32 receive scanning pulses produced by a scanning pulse generator 33 in synchronism with the timing pulses delivered by the controller 30. The drivers 31 and 32 deliver the X- and Y-direction position data to the display unit B so that the position indicated on the tablet A is displayed at the corresponding position on the display unit B. Thus, characters and patterns scribed on the tablet A by the position indicating bar magnet 7 from a position on or above the display unit B superposed on the tablet A is displayed as they are by luminescence on the display unit B. Therefore, it is possible to correct and display on the display unit B a character input to the tablet A and to effect editing such as the insertion and deletion of characters and words, provided that a suitable editing device is connected between the display unit B and the computer 22.

As has been described, according to the invention, it is possible to indicate a position on a tablet A from a position remote therefrom, i.e., by means of a position indicating magnetism generator from a position on or above a display unit B which is superposed on the tablet A. At the same time, the indicated position can be instantaneously displayed at the corresponding position on the display unit B, so that the user can easily draft a document while paying careful consideration to the calligraphic specimen and layout by observing the display on the display unit B.

Furthermore, since the position indicating magnetism generator can indicate a position without requiring any cord for connection to the main part of the coordinate input device, the operation of inputting characters and patterns can be very much facilitated.

The tablet A can be reinforced by a reinforcer such as an aluminum sheet or a copper sheet, because the indication of position can be effected even through such a reinforcer, provided that the intensity of the magnetic field produced by the position indicating magnetism generator is selected suitably.

In addition, since the display unit B is directly superposed on the tablet A, the operator is relieved from the burden of alternately watching the tablet surface and the display surface.

In addition, since the tablet A and the display unit B are constructed as a unit, a change of document size to any desired size, such as from A4 size to A5 size, can be attained while keeping the output composition displayed on the display unit and the input composition input to the tablet.

For these reasons, the operator can operate the coordinate input device of the invention without any high degree of skill or experience. In addition, the coordinate input device of the invention permits the easy drafting of a document in a neat style, so that it can be used very effectively in various tasks which are performed conventionally on a desk.

What is claimed is:

1. A coordinate input device comprising:
   a tablet having:
   (a) a plurality of parallel X-direction bars oriented substantially orthogonal to a plurality of parallel Y-direction bars, the bars being formed of magnetostrictive transmission mediums;
   (b) a X-direction first coil wound around first ends of the X-direction bars;
   (c) a Y-direction first coil wound around first ends of the Y-direction bars;
   (d) a X-direction second coil sequentially wound around the respective X-direction bars, the X-direction second coil covering lengthwise a substantial portion of each of the X-direction bars;
   (e) a Y-direction second coil sequentially wound around the respective Y-direction bars, the Y-direction second coil covering lengthwise a substantial portion of each of the Y-direction bars;
   a coordinate display superposed on the tablet;
   a separate position indicating magnetism generator for scribing above the tablet;
   a pulse current generator for applying a pulse current to one of the X-direction and Y-direction first coils for producing a magnetostrictive vibration wave in the corresponding magnetostrictive transmission mediums;
   a position processing unit for detecting the length of time from the moment at which the vibration wave is produced until the moment at which a voltage induced by the vibration wave appears in the second coil wound around the corresponding magnetostrictive transmission mediums, the length of time being used by the processing unit to determine the location of the position indicating magnetism generator above the tablet, the location of the induced voltage in the second soil corresponding proximately to the location of the position indicating magnetism generator above the tablet; and
   a position display device for displaying the location of the generator on the display.

2. A coordinate input system according to claim 1, wherein the magnetostrictive transmission mediums are made of an amorphous alloy.

3. A coordinate input system according to claim 1, wherein the display comprises a matrix-type liquid crystal display unit having a liquid crystal medium interposed between a plurality of horizontal electrodes and a plurality of vertical electrodes which cross each other.

4. A coordinate input device comprising:
   a tablet having:
   (a) a plurality of parallel X-direction bars oriented substantially orthogonal to a plurality of parallel Y-direction bars, the bars being formed of magnetostrictive transmission mediums:
   (b) a X-direction first coil wound around first ends of the X-direction bars;
   (c) a Y-direction first coil wound around first ends of the Y-direction bars;
   (d) a X-direction second coil sequentially wound around the respective X-direction bars, the X- direction second coil covering lengthwise a substantial portion of each of the X-direction bars;

(e) a Y-direction second coil sequentially wound around the respective Y-direction bars, the Y-direction second coil covering lengthwise a substantial portion of each of the Y-direction bars;

a coordinate display superposed on the tablet;

a separate position indicating magnetism generator for scribing above the tablet;

a plurality of biasing magnetic means for applying a biasing magnetic field to the first ends of the magnetostrictive bars;

a pulse current generator for applying a pulse current to one of the X-direction and Y-direction first coils for producing a magnetostrictive vibration wave in the corresponding magnetostrictive transmission mediums;

a position processing unit for detecting the length of time from the moment at which the vibration wave is produced until the moment at which a voltage induced by the vibration wave appears in the second coil wound around the corresponding magnetostrictive transmission medium; the length of time being used by the processing unit to determine the location of the position indicating magnetism generator above the tablet, and the location of the induced voltage in the second coil corresponding proximately to the location of the position indicating magnetism generator above the tablet;

a position display device for displaying the location of the generator on the display; and wherein, for the respective X-direction and Y-direction bars, the portions of the corresponding second coil wound around approximately half of the bars have a polarity opposite to the portions of the same second coil wound around the remaining bars; and wherein the polarity of the biasing magnetic means applying the biasing magnetic field to the approximately half of the bars is opposite to that of the biasing magnetic means applying the biasing magnetic field to the remaining bars.

* * * * *